United States Patent [19]

Batiuk et al.

[11] 3,919,358
[45] Nov. 11, 1975

[54] THERMOPLASTIC POLYMER BLENDS OF (1) EPDM HAVING A HIGH DEGREE OF UNSTRETCHED CRYSTALLINITY WITH (2) POLYETHYLENE

[75] Inventors: Martin Batiuk, Grafton; Richard M. Herman, Elyria; James C. Healy, Avon, all of Ohio

[73] Assignee: The B. F. Goodrich Company, Akron, Ohio

[22] Filed: Aug. 2, 1974

[21] Appl. No.: 494,028

[52] U.S. Cl...... 260/897 A; 260/28.5 A; 260/42.47; 260/45.8 N; 260/45.85; 260/45.9 R; 260/45.95
[51] Int. Cl.² ............................................. C08L 23/12
[58] Field of Search .................................... 260/897

[56] References Cited
UNITED STATES PATENTS

| | | |
|---|---|---|
| 3,361,850 | 1/1968 | Young ............................ 260/897 |
| 3,758,643 | 9/1973 | Fisher ........................... 260/897 A |
| 3,806,558 | 4/1974 | Fischer ......................... 260/897 A |

FOREIGN PATENTS OR APPLICATIONS

| | | |
|---|---|---|
| 1,043,078 | 9/1966 | United Kingdom................. 260/897 |
| 798,416 | 11/1968 | Canada ............................. 260/897 |

*Primary Examiner*—Carman J. Seccuro
*Attorney, Agent, or Firm*—Alan A. Csontos

[57] ABSTRACT

EPDM polymers having a high degree of unstretched crystallinity are physically blended with polyethylene polymers. The blends exhibit superior tensile strength, better than that predicted from their additive individual effects. The thermoplastic polymer blends are useful to prepare molded products, tubing, liners, and like products.

7 Claims, No Drawings

THERMOPLASTIC POLYMER BLENDS OF (1) EPDM HAVING A HIGH DEGREE OF UNSTRETCHED CRYSTALLINITY WITH (2) POLYETHYLENE

BACKGROUND OF THE INVENTION

Polymer blends of ethylene-propylene (EP) polymers or of ethylene-propylene-diene (EPDM) polymers with poly-α-monoolefin polymers, particularly with polyethylenes, are known to the art (See U.S. Pat. Nos. 3,176,052; 3,328,486; 3,361,850 and 3,751,521). At times, curing or crosslinking agents are added to effect chemical changes in the nature of the blend (See U.S. Pat. Nos. 3,256,366; 3,564,080; 3,758,643; and 3,806,558). Polymer blends described in U.S. Pat. Nos. 3,785,643 and 3,806,558 are stated to be thermoplastic in nature. They are prepared by partially crosslinking the polymers, particularly the EPDM polymers. The polymer blends of the present invention; i.e. physical blends of (1) EPDM polymers having a high degree of unstretched crystallinity and (2) polyethylene (PE) polymers, are thermoplastic in nature, yet do not use curing or crosslinking agents in their preparation. Additionally, the tensile strengths of the blends are superior to that predicted from the additive individual effects of the polymer components. In blends where low density PE polymers are used, tensile strengths of the blends are higher than either polymer component alone.

SUMMARY OF THE INVENTION

Thermoplastic polymer blends comprising (1) an ethylene-propylene-diene (EPDM) polymer having a high unstretched crystallinity of at least about 10 percent by weight, and (2) a polyethylene (PE) polymer are prepared by physically mixing under heat and shear conditions the two polymer components. The thermoplastic blends exhibit tensile strengths greater than that predicted from each polymers individual contributive effect. Especially good results are obtained with blends of the EPDM polymer and low density PE polymer. No curing or cross-linking agents are used to obtain the superior tensile strengths of the thermoplastic blend.

DETAILED DESCRIPTION OF THE INVENTION

The thermoplastic polymer blends of this invention comprise a physical mixture of two polymer components; i.e. an ethylene-propylene-diene (EPDM) polymer and a polyethylene (PE) polymer. The polymers are mixed in a range of from about 5 parts by weight to about 200 parts by weight of PE per 100 parts by weight of EPDM polymer. The use of over 200 parts of PE per 100 parts of EPDM in the polymer blend is not necessary to achieve the advantages of the present invention. Excellent results are obtained in a range of from about 10 parts to about 100 parts of PE per 100 parts of EPDM.

The polymer blends are truly thermoplastic, exhibiting excellent strength and structural stability at ambient temperature but easily processable at temperatures above 120°C. A smooth roll is formed in milling operations, and the blends are readily extrudable and moldable, having good flow properties. Formed items made from the blends are reprocessable. In contrast to the thermoplastic blends disclosed in U.S. Pat. Nos. 3,785,643 and 3,806,558, the polymer blends of the present invention do not need or use curing or crosslinking agents to effect partial cure of the polymer components, particularly the EPDM polymer. However, also in contrast to other known thermoplastic blends employing an EPDM polymer, the EPDM polymers used in the present invention are unique in having a high unstretched crystallinity, which is a measurable property of the EPDM polymer. Other properties of the unique EPDM polymer used are disclosed in the following discussion.

The ethylene-propylene-diene EPDM) polymers employed have high unstretched crystallinity, ranging from a minimum of about 10% by weight to about 20% by weight based upon the weight of the polymer. More preferredly, the unstretched crystallinity of the polymer ranges from about 12% to about 16% by weight of the EPDM polymer. The unstretched crystallinity of the EPDM polymer is measured using an X-ray technique. Measuring weight percent crystallinity in polymers via X-ray is a known technique (see Natta et al, Atti Accad-Nazi. Lincei. Rend. (8) 8 11 (1957)). The method used herein consisted of pressing a 0.020 inch thick film of the EPDM polymer at 120°C. and 20,000 pounds pressure. The films were quickly cooled (quenched). The thin films are then mounted and exposed to X-rays, and a defraction scan is made across an angular range. Using a diffractometer, a plot of the angular distribution of the radiation scattered by the film is made. This plot is seen as a diffraction pattern of sharp crystalline peaks superimposed upon an amorphous peak. The quantitative value of weight percent crystallinity is obtained by dividing the crystalline diffraction area of the plot by the total diffraction area on the plot.

The EPDM polymers also exhibit a large melt endotherm of from about 6 to about 10 calories/gram. The melt endotherm is measured using a Differential Scanning Calorimeter (DSC) sold by DuPont as the DuPont 900 Thermal Analyzer. The test measures orientation within the polymer. A completely amorphous EPDM terpolymer would have a zero melt endotherm. The test consists of placing a polymer sample of known weight into a closed aluminum pan. DSC cell calorimeter pans supplied by DuPont were used. The polymer sample is then heated at a rate of 10°C./minute over a temperature range of from −100°C. to +75°C. The reference material used is glass beads. The DSC chart is precalibrated, using metals with known heats of fusion, to provide a chart having a unit area in terms of calories/-square inch/minute. As the polymer sample is heated, a crystalline melt point peak will show on the chart. The area under the crystalline melt point peak is measured, and the melt endotherm in calories/gram is calculated from the area obtained.

The EPDM polymer is comprised of interpolymerized units of ethylene, propylene and diene monomers. The ethylene forms from about 65% to about 85% by weight of the polymer, the propylene from about 5% to about 35% by weight, and the diene from about 0.2% to about 10% by weight, all based upon the total weight of the EPDM polymer. More preferredly, the ethylene content is from about 70% to about 80% by weight, the propylene content is from about 15% to about 29% by weight, and the diene content is from about 1% to about 5% by weight of the EPDM polymer. Examples of the diene monomers are: conjugated dienes such as isoprene, butadiene, chloroprene, and the like; and nonconjugated dienes, containing from 5 to about 25 carbon atoms, such as 1,4-pentadiene, 1,4-hexadiene, 1,5-hexadiene, 2,5-dimethyl-1,5-hexadiene, 1,4-octadiene, and the like; cyclic dienes such as cyclopentadiene, cyclohexadiene, cyclooctadiene, dicyclopentadiene, and the like; vinyl cyclic enes such as 1-vinyl-1-cyclopentene, 1-vinyl-1-cyclohexene, and the like; alkylbicyclonondienes such as 3-methylbicyclo(4,2,1-)nona-3,7-diene, 3-ethyl-bicyclonondiene, and the like; indenes such as methyl tetrahydroindene, and the like; alkenyl norbornenes such as 5-ethylidene-2-norbornene, 5-butylidene-2-norbornene, 2-methallyl-5-norbornene, 2-isopropenyl-5-norbornene, 5-(1,5-hexadienyl)-2-norbornene, 5-(3,7-octadieneyl)-2-norbornene, and the like; and tricyclo dienes such as 3-methyl-tricyclo(5,2,1,0$^{2,6}$)-3,8-decadiene, and the like. The more preferred dienes are the nonconjugated dienes. Particularly good results are obtained when alkenyl norbornenes are used as the diene monomer.

The presence of interpolymerized diene monomer in the EPDM polymer is a necessary feature of the EPDM polymer. It was found that blends of EP (ethylene-propylene) polymers with polyethylene polymers did not exhibit the unexpectedly high tensile strengths which characterize the blends of the invention. The type of diene monomer used is not critical as long as the EPDM polymer employed has high unstretched crystallinity. psi, The EPDM polymers can be readily prepared following known suspension and solution polymerization processes and techniques.

The EPDM polymers are high molecular weight, solid elastomers. They have a dilute solution viscosity (DSV) of about 1.6 to about 2.5 measured at 25°C. as a solution of 0.2 gram of EPDM polymer per diciliter of toluene. The raw polymer has a green strength tensile of about 800 psi to about 1800 pis, and more typically, from about 1000 psi to about 1600 psi, and an elongation at break of at least about 600 percent.

The polyethylene employed in the blend can be a low (to about 0.94 grams/cc.) density, medium (about 0.94 grams/cc. to about 0.96 grams/cc.) density, or high (above about 0.96 grams/cc.) density polyethylene. The low density polyethylenes are more preferred as they provide actual tensile reinforcement between polymers. The polyethylenes have a melt index of from about 0.2 grams/10 minutes to about 30 grams/10 minutes measured at 190°C. under a 2.16 kilogram load. If a low density polyethylene is used, the melt index is preferredly below 7 gram/10 minutes. The polyethylenes are commercially available, and can be readily prepared using standard polymerization techniques known to the art. As mentioned before, the polyethylene is used at from about 5 parts to about 200 parts by weight with 100 parts by weight of the EPDM polymer. Particularly good results are obtained when the PE is used at about 10 parts to about 100 parts by weight with 100 parts by weight of EPDM polymer.

The composition of the invention comprises a physical blend of the EPDM polymer and polyethylene (PE) polymer. No cure or crosslinking agents are employed. It was totally unexpected that the thermoplastic polymer blend of the two polymeric components would exhibit a tensile strength greater than that predicted from the additive individual effects of any one component alone. Prior to this invention, the classic behavior of uncured polymer blends is that tensile strengths of the blend would be lower than the additive individual effects of each polymer. It was further unexpected that the use of crystalline EPDM and low density PE in the blends would produce higher tensile strengths in the blend than the tensile strength of either one polymer component alone.

The polymer blends are truly thermoplastic, moldable and remoldable at temperatures of above 120°C., preferably at above 140°C. to about 200°C., yet having a strong, flexible plastic nature at room temperatures.

A wide range of rubber and plastic compounding ingredients are readily mixed with the thermoplastic polymer blends using mixing equipment such as two-roll mills, extruders, banbury mixers, and the like. Standard mixing and addition techniques are used. In many cases, the addition of compounding ingredients, particularly waxes, plasticizers and extenders, can detract from the overall tensile strength of the thermoplastic blend. Reinforcing fillers such as fumed silica provide increased tensile strength to the blends.

Examples of compounding ingredients are metal oxides like zinc, calcium, and magnesium oxide, lead monoxide and dioxide, fatty acids such as stearic and lauric acid, and salts thereof such as cadmium, zinc and copper stearate and lead oleate; fillers such as the carbon blacks like channel blacks, high reinforcing blacks as N110 and N330, low reinforcing blacks as N550 and N770, and thermal blacks as N880 and N990, calcium and magnesium carbonates, calcium and barium sulfates, aluminum silicates, phenol-formaldehyde and polystyrene resins, asbestos, and the like; plasticizers and extenders such as dialkyl and diaryl organic acids like diisobutyl, diisooctyl, diisodecyl, and dibenzyl oleates, stearates, sebacates, azelates, phthalates, and the like; ASTM type 2 petroleum oils, ASTM D2226 aromatic, naphthalenic and paraffinic oils, castor oil, tall oil, glycerin, and the like; antioxidants, antiozonants, and stabilizers such as di-$\beta$-naphthyl-p-phenylenediamine, phenyl-$\beta$-naphthylamine, dioctyl-p-phenylenediamine, N-1,3-dimethylbutyl-N-phenyl-p-phenylenediamine, 4-isopropylamino diphenylamine, 2,6-di-t-butyl paracresol, 2,2'-methylenebis-(4-ethyl-6-t-butyl phenol), 2,2'-thiobis-(4-methyl-6-t-butyl phenol), bisphenol-2,2'-methylenebis-6-t-butyl-4-ethylphenol, 4,4'-butylidenebis-(6-t-butyl-m-cresol), 2-(4-hydroxy-3,5-t-butylaniline)-4,6-bis(octylthio)-1,3,5-triazine, hexahydro-1,3,5-tris-$\beta$-(3,5-di-t-butyl-4-hydroxyphenyl)propionyl-s-triazine, tris-(3,5-di-t-butyl-4-hydroxybenzyl)isocyanurate, tetrakismethylene-3-(3',5'-di-t-butyl-4'-hydroxyphenyl)propionate methane, distearyl thiodipropionate, dilauryl thiodipropionate, tri(nonylatedphenyl)phosphite, and the like; and other ingredients such as pigments, tackifiers, flame retardants, fungicides, and the like. Such ingredients are used in levels well known to those skilled in the art.

Applications for the thermoplastic polymer blends include tubing, wire and cable insulation, mats, and molded items such as shoe soles, toys, kitchen ware, and the like.

The blends were evaluated for their stress-strain properties; i.e. tensile, modulus, and elongation, following ASTM procedure D638 (using a pull rate of 20 inches/minute). Hardness was measured following ASTM D2240.

The following Examples are presented to further illustrate the invention. Unless otherwise stated, the ingredients recited in the recipes are used in parts by weight.

EXAMPLES

The polymeric components of the blends, along with compounding ingredients, if used, were mixed together using a two-roll mill. The roll ratio was 1.2 to 1 and the front roll has a roll speed of 21 rpm. Front roll temperaother EPDM and ethylenepropylene (EP) polymers were also mixed with the same PE polymer and the blends evaluated. The PE polymer used has a density of 0.92 g./cc. and a tensile strength of 1800 psi and an elongation of 570 percent. The EPDM polymers employed are identified as follows:

|  | Tensile Strength (psi) | Elongation (percent) | Weight % Crystallinity | Melt Endotherm (calories/g.) | Weight Percent Monomers | | |
|---|---|---|---|---|---|---|---|
|  |  |  |  |  | Ethylene | Propylene | Diene[b] |
| EPDM-1 | 1640 | 680 | 12.9 | 8.6 | 73 | 23 | 4 |
| EPDM-2 | 1025[a] | 275[a] | 3.8 | 1.7 | 69 | 23 | 8 |
| EPDM-3 | 900[a] | 720[a] | — | 0.3 | 69 | 23 | 8 |
| EP-4 | 700[a] | 500[a] | — | 4.8 | 68 | 32 | — |
| EPDM-5 | 500[a] | 1000[a] | 2.7 | 3.8 | 69 | 23 | 8 |
| EP-6 | 750 | 770 | — | — | 76 | 24 | — |
| EPDM-7 | 200[a] | 1000[a] | 4.1 | 2.2 | 65 | 31 | 4 |
| EP-8 | 25[a] | 500[a] | — | none | 50 | 50 | — |

[a]Averaged data
[b]Diene monomer used is 5-ethylidene-2-norbornene ture was 150°C. with the back roll slightly cooler. The EPDM was banded on the mill and the other polymeric and compounding ingredients (if used) added to the banded polymer. Mill time was about 5 minutes.

The mixing conditions and temperatures outlined above are not critical. The important factor is to get uniform dispersion of the polymers and ingredients in the thermoplastic blend. This can be accomplished using other equipment, such as a Banbury mixer, by mixing at other temperatures and for other times, and the like; all of which conditions and procedures are well known to the artisan. The above conditions were used to achieve good, thorough mixing, and are outlined to illustrate the preparation of the physical blends of the Examples.

EXAMPLE I

A highly crystalline EPDM polymer was mixed with a low density polyethylene (PE-C14) polymer, and the resulting thermoplastic blend evaluated for its tensile strength and elongation. For comparative purposes, The EPDM (and EP) polymers and PE polymer were blended together using a two-roll mill operating at a roll temperature of about 160°C. The polymers were mixed about 5 minutes, sheeted off of the mill and pressed in a tensile mold to prepare samples for tensile and elongation measurements. The recipes used and data obtained are as follows:

|  | 1 | 2 | 3 | 4 | 5 | 6 | 7 | 8 |
|---|---|---|---|---|---|---|---|---|
| EPDM-1 | 100 | — | — | — | — | — | — | — |
| EPDM-2 | — | 100 | — | — | — | — | — | — |
| EPDM-3 | — | — | 100 | — | — | — | — | — |
| EP-4 | — | — | — | 100 | — | — | — | — |
| EPDM-5 | — | — | — | — | 100 | — | — | — |
| EP-6 | — | — | — | — | — | 100 | — | — |
| EPDM-7 | — | — | — | — | — | — | 100 | — |
| EP-8 | — | — | — | — | — | — | — | 100 |
| PE-C14 | 25 | 25 | 25 | 25 | 25 | 25 | 25 | 25 |
| Tensile, psi | 2110 | 1800 | 1490 | 1560 | 1100 | 1040 | 450 | 80 |
| Elongation, percent | 720 | 530 | 780 | 660 | 880 | 750 | 1010 | 580 |
| Hardness, Durometer A | 79 | 76 | 60 | 77 | 72 | 80 | 66 | 60 |

Sample 1, a thermoplastic polymer blend of the present invention, has excellent tensile strength. The measured tensile strength is unexpectedly superior to those of the other blends, and is higher than the tensile strength of either polymer component used alone.

EXAMPLE II

The experimentation in Example I was repeated but for the use of a high density polyethylene (PE-LB733) polymer in the blend. The PE used has a density of 0.95 g./cc. and a tensile strength of 3800 psi. Again the thermoplastic blend containing EPDM-1, a polymer of the present invention, exhibited the highest tensile strength

|  | 1 | 2 | 3 | 4 | 5 | 6 | 7 | 8 |
|---|---|---|---|---|---|---|---|---|
| EPDM-1 | 100 | — | — | — | — | — | — | — |
| EPDM-2 | — | 100 | — | — | — | — | — | — |
| EPDM-3 | — | — | 100 | — | — | — | — | — |
| EP-4 | — | — | — | 100 | — | — | — | — |
| EPDM-5 | — | — | — | — | 100 | — | — | — |
| EPDM-7 | — | — | — | — | — | 100 | — | — |
| EP-8 | — | — | — | — | — | — | 100 | — |
| EPDM-9[a] | — | — | — | — | — | — | — | 100 |
| PE-LB633 | 25 | 25 | 25 | 25 | 25 | 25 | 25 | 25 |
| Tensile, psi | 2180 | 2020 | 1220 | 1310 | 780 | 250 | 60 | 150 |
| Elongation, percent | 730 | 530 | 760 | 660 | 940 | 480 | 530 | 300 |
| Hardness, Durometer A | 83 | 81 | 68 | 83 | 80 | 72 | 70 | 67 |

[a]58% ethylene/38% propylene/4% 5-ethylidene-2-norbornene terpolymer having an averaged tensile strength of 50 psi and elongation of 500 percent.

EXAMPLE III

The highly crystalline EPDM polymer used in Example I (EPDM-1) wsa blended with different types of polyethylene polymer. The blends were evaluated for their tensile properties. Recipes and data follow:

|  | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| EPDM[a] | 100 | 100 | 100 | 100 | 100 | 100 | 100 | 100 | 100 | 100 | 100 | 100 | 100 | 100 | 100 |
| PE-NA107[b] | 10 | 25 | 50 | 75 | — | — | — | — | — | — | — | — | — | — | — |
| PE-NA301[c] | — | — | — | — | 10 | 25 | 50 | 75 | — | — | — | — | — | — | — |
| PE-DNPA3130[d] | — | — | — | — | — | — | — | — | 25 | 50 | 74.3 | — | — | — | — |
| PE-DND2004[e] | — | — | — | — | — | — | — | — | — | — | — | 10 | 25 | 50 | 75 |
| Wax E[f] | 1 | 1 | 1 | 1 | 1 | 1 | 1 | 1 | 1 | 1 | 1 | 0.2 | 0.2 | 0.2 | 0.2 |
| Tensile, psi | 2040 | 2310 | 2710 | 2670 | 1980 | 2470 | 2710 | 2700 | 2190 | 2790 | 2730 | 1720 | 2280 | 2460 | 2340 |
| Elongation, percent | 750 | 740 | 750 | 770 | 730 | 760 | 790 | 780 | 730 | 750 | 760 | 720 | 770 | 770 | 750 |

[a]Highly crystalline EPDM polymer of 73% ethylene/23% propylene/4% ethylidene-2-norbornene having a tensile strength of 1330 psi and an elongation of 700 percent.
[b]Polyethylene having a density of 0.92 g./cc., a melt index of 0.48 g./10 minutes at 190°C., a 1430 psi tensile, and a 500 percent elongation.
[c]Same polymer as in Example III.
[d]Polyethylene having a density of 0.92 g./cc., a melt index of 1.0 g./10 minutes at 190°C., and a tensile strength of about 2000 psi.
[e]Polyethylene having a density of 0.92 g./cc., a melt index of 1.5 g./10 minutes at 190°C., a tensile of 1820 psi, and an elongation of 650 percent.
[f]lubricant

| Tensile Strength (psi) | | 1 | 2 | 3 | 4 |
|---|---|---|---|---|---|
| EPDM-1 | 1640 | 100 | 100 | 100 | 100 |
| PE-NA301[a] | 2090 | 10 | — | — | — |
| PE-C14[b] | 1800 | — | 10 | — | — |
| PE-LS630[c] | about 4500 | — | — | 10 | — |
| PE-LB733[d] | 3800 | — | — | — | 10 |
| Tensile strength, psi | | 2300 | 2300 | 2160 | 2520 |
| Elongation, percent | | 660 | 670 | 680 | 700 |
| Hardness, Durometer A | | 72 | 72 | 75 | 75 |

[a]polyethylene having a density of 0.92 g./cc., a melt index at 190°C. of 1.28 g/10 minutes, a tensile strength of 2090, and an elongation of 650 percent.
[b]polyethylene having a density of 0.92 g./cc., a tensile strength of 1800 psi, and an elongation of 570 percent.
[c]polyethylene having a density of 0.96 g./cc., a melt index of 28 g./10 min., a tensile strength of about 4500 psi (pulled at 2 inches/minute), and an elongation of about 25 percent.
[d]polyethylene having a density of 0.95 g./cc., a melt index of 0.23 g./10 minutes, and a tensile strength of 3800 psi, and an elongation of about 60 percent.

Samples 1 and 2 contained low density PE polymers in the thermoplastic blends. In both cases the tensile strength of the blend is higher than that of any one polymer component. Samples 3 and 4 contained medium to high density PE polymers. The blend tensile strengths in both instances are higher than what would have been predicted from the additive effects of the tensile of the PE polymer to the EPDM polymer, on a weight percent basis. For example, sample 3 would have a predicted tensile value of (1640 + 410) = 2050 psi, and Sample 4 would have a predicted tensile value of (1640 + 350) = 1990 psi, while the actual values were 2160 psi and 2520 psi respectively.

EXAMPLE IV

An EPDM polymer similar in composition to the highly crystalline EPDM polymer of Example I was blended with various PE polymers at various levels of PE polymer to EPDM polymer. The polymers were mixed for 7 minutes on a two-roll mill operating at 160°C. All of the resulting thermoplastic blends exhibited excellent tensile strengths. The data shows that, generally, the use of over 50 parts by weight of PE polymer per 100 parts of EPDM polymer is not necessary to achieve the maximum tensile properties of the blends. A small amount of lubricant was used in the blends. As will be shown in the next example, lubricants can detract from the overall tensile strength of the blends.

EXAMPLE V

Many types of standard rubber and plastic compounding ingredients can be mixed with the thermoplastic polymer blends of the invention, particularly fillers and reinforcing agents, antioxidants and stabilizers, and plasticizers and lubricants. The compounding ingredients can be added using procedures and in amounts well known to those skilled in the art. However, it has been found that the addition of lubricants can detract from the overall tensile strength of the thermoplastic polymer blends. The following data demonstrates this fact. The EPDM polymer and PE polymer used are similar to those employed in samples 12 to 15 of the previous example.

|  | 1 | 2 | 3 |
|---|---|---|---|
| EPDM | 100 | 100 | 100 |
| PE-DND2004 | — | 100 | 100 |
| Aristowax[a] | — | — | 5 |
| Tensile strength, psi | 1270 | 2650 | 2470 |
| Elongation, percent | 670 | 760 | 700 |

[a]paraffinic wax lubricant having a melting point of about 165°F.

We claim:

1. A thermoplastic polymer blend comprising (1) an EPDM polymer consisting essentially of interpolymerized units of about 65 percent to about 85 percent by weight of ethylene, about 5 percent to about 35 percent by weight of propylene, and about 0.2 percent to about 10 percent by weight of a diene monomer; said EPDM polymer having a weight percent unstretched crystallinity of from about 10 percent to about 20 percent by weight of the polymer and a melt endotherm value of about 6 to about 10 calories per gram and (2) from about 5 parts to about 200 parts by weight per 100 parts by weight of the EPDM polymer, of a polyethylene polymer.

2. A thermoplastic polymer blend of claim 1 wherein the EPDM polymer consists essentially of interpolymerized units of from about 70 percent to about 80 percent by weight of ethylene, about 15 percent to about 29 percent by weight of propylene, and about 1 percent to about 5 percent by weight of a nonconjugated diene monomer containing from 5 to about 25 carbon atoms in the monomer.

3. A thermoplastic polymer blend of claim 2 wherein the nonconjugated diene monomer is an alkenyl norbornene.

4. A thermoplastic polymer blend of claim 2 wherein the polyethylene polymer is present in from about 10 parts to about 100 parts by weight per 100 parts by weight of EPDM polymer.

5. A thermoplastic polymer blend of claim 4 wherein the polyethylene polymer is a low density polyethylene having a density of below about 0.94 gram/cc.

6. A thermoplastic polymer blend of claim 5 wherein the EPDM polymer consists essentially of interpolymerized units of ethylene, propylene, and 5-ethylidene-2-norbornene monomers and the polyethylene has a density of about 0.92 gram/cc.

7. A thermoplastic polymer blend of claim 6 comprising (1) an EPDM polymer consisting essentially of interpolymerized units of about 73 percent by weight of ehtylene, about 23 percent by weight of propylene, and about 4 percent by weight of 5-ethylidene-2-norbornene, and (2) from about 10 parts to about 100 parts by weight per 100 parts by weight of the EPDM polymer, of a polyethylene polymer having a density of about 0.92 gram/cc.

* * * * *